United States Patent [19]

Tachibana

[11] Patent Number: 4,985,287
[45] Date of Patent: Jan. 15, 1991

[54] LIGHT-STABILIZED, VINYL CHLORIDE RESIN BODY

[75] Inventor: Masao Tachibana, Koshigaya, Japan

[73] Assignee: Somar Corporation, Japan

[21] Appl. No.: 369,996

[22] Filed: Jun. 23, 1989

[30] Foreign Application Priority Data

Jun. 27, 1988 [JP] Japan ................................ 63-158406

[51] Int. Cl.$^5$ ................................................ B32B 5/16
[52] U.S. Cl. .................................. 428/34.5; 428/36.4; 428/372; 428/403; 523/200; 524/431; 524/432
[58] Field of Search ................ 523/200; 524/431, 432; 428/36.4, 372, 403, 34.5

[56] References Cited

U.S. PATENT DOCUMENTS

| | | | |
|---|---|---|---|
| 2,902,460 | 9/1959 | Jennings | 260/41 |
| 3,925,297 | 12/1975 | Sprengling | 523/200 |
| 4,183,843 | 1/1980 | Koenig et al. | 523/200 |
| 4,386,169 | 5/1983 | Artur et al. | 523/200 |
| 4,640,943 | 2/1987 | Meguro et al. | 523/200 |
| 4,891,399 | 1/1990 | Ohkawa et al. | 523/200 |

FOREIGN PATENT DOCUMENTS

| | | | |
|---|---|---|---|
| 0052868 | 6/1982 | European Pat. Off. | 523/200 |
| 0062406 | 10/1982 | European Pat. Off. | 523/200 |
| 0047033 | 4/1976 | Japan | 523/200 |

*Primary Examiner*—James Seidleck
*Attorney, Agent, or Firm*—Lorusso & Loud

[57] ABSTRACT

A light-stabilized plastic article is disclosed which includes a shaped body of a vinyl chloride resin, and finely divided particles of a metal oxide capable of screening ultraviolet rays and dispersed in the shaped body, each of the particles being coated with a layer of an anion surfactant.

10 Claims, No Drawings

LIGHT-STABILIZED, VINYL CHLORIDE RESIN BODY

BACKGROUND OF THE INVENTION

This invention relates to a plastic article and, more specifically, to a shaped, light-stabilized, vinyl chloride resin article.

Vinyl chloride resins are now utilized for various applications such as outdoor construction materials. One problem involved in vinyl chloride resin articles is their instability when exposed to sunlight. That is, a vinyl chloride resin undergoes photochemical decomposition upon exposure to ultraviolet rays to form hydrogen chloride. The thus formed hydrogen chloride also accelerates the decomposition of the resin. A number of additives, such as UV screener and a UV absorbent, have been proposed for incorporation into the resin so as to stabilize the resin.

One well known UV screener is ferric oxide (red iron oxide). Since, however, the ferric chloride UV screener can react with hydrogen chloride produced by the photochemical decomposition of the vinyl chloride to form ferric chloride, the light-stabilizing effect is gradually lost with time. Further, the ferric chloride, which is water-soluble, is gradually dissolved in water to spoil beauty of the vinyl chloride resin article and to degrade the weatherability thereof.

SUMMARY OF THE INVENTION

It is, therefore, an object of the present invention to provide a vinyl chloride resin article which has solved the above-mentioned problem and which has excellent stability to UV rays.

In accomplishing the above object, the present invention provides a plastic article comprising a shaped body of a vinyl chloride resin, and finely divided particles of a metal oxide capable of screening and/or absorbing ultraviolet rays and dispersed in said shaped body, each of said particles being coated with a layer of an anionic surfactant.

The shaped plastic body may be in the form of a sheet, a film, a plate, a pipe, a tube, a bottle, a vessel, a rod or any other shape and may be used, for example, as greenhouse sheets, roof materials, eaves, troughs, water pipes and wire sheathes.

The term "vinyl chloride resin" used in the present specification is intended to refer a polyvinyl chloride or a copolymer containing vinyl chloride.

Other objects, features and advantages of the present invention will become apparent from the detailed description of the invention to follow.

DETAILED DESCRIPTION OF THE INVENTION

The present invention uses, as a light screener and/or absorbent, finely divided metal oxide particles coated with a layer of an anionic surfactant so that vinyl chloride resin articles containing them exhibit improved light-stability as compared with those containing non-coated metal oxide. The reason for this is believed to be that the anionic surfactant layer can prevent the hydrogen chloride produced by decomposition of the vinyl chloride resin from contacting the metal oxide, thereby preventing the formation of a chloride of the metal.

Any metal oxide may be used for the purpose of the present invention as long as it can screen or absorb UV rays. Illustrative of suitable metal oxides are iron oxide, zinc oxide, cobalt oxide, titanium oxide and nickel oxide. Above all, the use of ferric oxide is particularly preferred because of its excellent light-stabilizing effect. The particle size of the metal oxide particles is preferably 20 $\mu$m or less, more preferably 1 $\mu$m or less, most preferably 300 Å or less.

The anionic surfactant to be used for coating the metal oxide particles may be, for example, a metal salt of a fatty acid, soap, an alkylbenzenesulfonate, an alkyl-naphthalene-sulfonate, a dialkylenesulfosuccinate, an alphaolefin sulfonate or sodium N-acylmethyl taurate. Of these the use of a metal salt of a fatty acid is particularly preferred. The metal of the metal salt is preferably an alkaline metal and the fatty acid is preferably selected from those having 8–22 carbon atoms. Two or more fatty acid metal salts may be suitably used in the form of a mixture as the anionic surfactant. Illustrative of suitable fatty acid metal salts are sodium oleate, potassium oleate, sodium stearate and potassium stearate.

The anionic surfactant-coated metal oxide can be prepared, for example, by mixing finely divided metal oxide with a solution containing an anionic surfactant and drying the resultant mixture. Another effective method for the preparation of such coated metal oxide power includes dispersing a metal oxide sol in a suitable medium containing an anionic surfactant. This method is disclosed in Japanese Published, Unexamined Patent Application (Tokkyo Kokai) No. 62-83,305.

The plastic article according to the present invention may be prepared by shaping or molding a composition containing a vinyl chloride resin and the above-described surfactant-coated metal oxide particles. The shaping or molding may be performed in any known manner. The amount of the metal oxide particles coated with the surfactant is generally in the range of 0.1–10% by weight based on the weight of the vinyl chloride resin. When the metal oxide particles have a particle size of 300 Å or less, the amount of the metal oxide particles coated with the surfactant may be reduced to 0.1–5% by weight based on the weight of the vinyl chloride resin. Other additives such as a plasticizer (e.g. dioctylphthalate), a stabilizer (e.g. zinc stearate and lead phosphite), a filler (e.g. clay), a coloring agent or pigment, and a UV absorbent (e.g. a benzophenone compound) may be incorporated into the composition, as desired.

The following examples will further illustrate the present invention. In the examples, "part" is by weight.

EXAMPLE 1

A resin composition having the following formulation was extruded to obtain a vinyl chloride resin sheet having a thickness of 0.6 mm.

| Vinyl chloride resin *1 | 126 parts |
|---|---|
| Coated Fe$_2$O$_3$ particles *2 | 0.2 part |
| Dibutyl tin maleate | 5 parts |
| Barium stearate | 2.5 parts |

*1: A polyvinyl chloride powder, Trademark: ZEON 103EP, manufactured by Nippon Zeon Co., Ltd.
*2: Trademark: FE-ST, manufactured by Okamura Seiyu Co., Ltd., average particle size: about 50 Å, coated with a monomolecular film of potassium stearate The thus obtained sheet showed a spectral transmittance (%) as shown in Table 1.

EXAMPLES 2 AND 3

Example 1 was repeated in the same manner as described except that the amount of the coated iron oxide was changed to 0.4 part (Example 2) and 0.6 part (Example 3). The sheets showed a spectral transmittance as shown in Table 1.

COMPARATIVE EXAMPLE 1

Example 1 was repeated in the same manner as described except that coated iron oxide was not used. The sheet showed a spectral transmittance as shown in Table 1.

COMPARATIVE EXAMPLE 2

Example 3 was repeated in the same manner as described except that non-coated iron oxide particles ($Fe_2O_3$ pigment, particle size: 3 μm, manufactured by Kikuchi Pigment Co., Ltd.) were used in lieu of the coated iron oxide. The sheet showed a spectral transmittance as shown in Table 1.

STABILITY TEST

The thus obtained sheets were each attached to an rectangular frame (5 cm × 5 cm) and allowed to stand in the open air for 180 days. Each sheet was then cleaned with water, wiped with a cloth and measured for its spectral transmittance. The results were as summarized in Table 1.

As is evident from the results shown in Table 1, the vinyl chloride resin sheets containing anionic surfactant-coated iron oxide exhibit improved light-stability in comparison with that containing non-coated iron oxide.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

TABLE 1

| Example | Amount of light screener (part) | | Spectral Transmittance (%) | | | | | |
|---|---|---|---|---|---|---|---|---|
| | | | 200 nm | 300 nm | 400 nm | 500 nm | 600 nm | 700 nm |
| 1 | 0.2 | Before test | 0.3 | 0.3 | 8.0 | 49.2 | 80.6 | 85.6 |
| | | After test | 0.4 | 0.4 | 7.6 | 47.0 | 78.5 | 83.0 |
| 2 | 0.4 | Before test | 0.4 | 0.4 | 1.4 | 33.4 | 76.7 | 85.4 |
| | | After test | 0.4 | 0.4 | 1.3 | 32.5 | 74.8 | 83.2 |
| 3 | 0.6 | Before test | 0.4 | 0.4 | 0.4 | 18.1 | 69.5 | 82.4 |
| | | After test | 0.4 | 0.4 | 0.4 | 17.6 | 68.7 | 82.0 |
| Comp. 1 | — | Before test | 0.4 | 15.8 | 68.1 | 76.8 | 80.5 | 83.8 |
| | | After test | 0.4 | 10.6 | 53.6 | 56.3 | 58.8 | 61.7 |
| Comp. 2 | 0.6 | Before test | 0.4 | 6.4 | 8.5 | 8.7 | 9.5 | 9.8 |
| | | After test | 0.4 | 3.4 | 4.2 | 4.2 | 4.5 | 4.7 |

What is claimed is:

1. A plastic article comprising a shaped body of a vinyl chloride resin, and finely divided particles of a metal oxide capable of screening ultraviolet rays and dispersed in said shaped body, each of said particles being coated with a layer of an anionic surfactant, said particles coated with surfactant being present in said article in the amount of 0.1–10% by weight, based on the weight of said vinyl chloride resin.

2. A plastic article as claimed in claim 1, wherein said metal oxide is at least one member selected from iron oxide, zinc oxide, cobalt oxide, titanium oxide and nickel oxide.

3. A plastic article as claimed in claim 1, wherein said metal oxide is ferric oxide.

4. A plastic article as claimed in claim 1, wherein said metal oxide particles have a particle size of 20 μm or less.

5. A plastic article as claimed in claim 1, wherein said anionic surfactant is at least one member selected from the group consisting of metal salts of fatty acids, alkylbenzenesulfonates, alkylnaphthalenesulfonates, dialkylsulfosuccinates, alphaolefin sulfonates and sodium N-acylmethyl taurate.

6. A plastic article as claimed in claim 1, wherein said anionic surfactant is an alkali metal salt of a fatty acid having 8–22 carbon atoms.

7. A plastic article as claimed in claim 1, wherein said anionic surfactant is potassium oleate, sodium oleate, potassium stearate, or sodium stearate.

8. A plastic article as claimed in claim 1, wherein said metal oxide particles have a particle size of 300 Å or less.

9. A plastic article as claimed in claim 8, wherein said metal oxide particles coated with the anionic surfactant are used in amount of 0.1–5% by weight based on the weight of said vinyl chloride resin.

10. A plastic article as claimed in claim 1, wherein said shaped body is in the form of a sheet, a film, a plate, a pipe, a tube, a bottle, a vessel or a rod.

* * * * *